July 14, 1931.  J. H. MUNSON  1,814,054
AUTOMOBILE HUB CAP
Filed Jan. 17, 1931

Inventor
John H. Munson,
By Wolk, Littlehales & Johnston
Attorneys

Patented July 14, 1931

1,814,054

UNITED STATES PATENT OFFICE

JOHN H. MUNSON, OF HOLLYWOOD, CALIFORNIA

AUTOMOBILE HUB CAP

Application filed January 17, 1931. Serial No. 509,500.

This invention relates to automobile hub caps, and more particularly to a hub cap which is provided with a protected reflector in its outer face thereby to reflect light from the side of the vehicle to which it is affixed and, consequently, to serve as a warning to the drivers of vehicles approaching from the side, from which position the running lights of the obstructing vehicle are not readily visible. The present application is a continuation in part of my application, Serial No. 362,824, filed May 13, 1929.

It is an object of my invention to provide a hub cap with an inset reflector in its outer surface, whereby the reflector will be protected against casual impact which might cause its breakage.

A further object is to provide, in a hub cap, an inset reflector, the outer surface of which is smooth and will not readily accumulate dust and dirt which would decrease its efficiency or obscure it, and which may be easily and quickly cleaned when occasion requires.

A still further object is to provide, in a hub cap, an inset, concave reflector which is readily replaceable in the event of breakage and which, being concave rather than convex, is discernible through a comparatively wide angle and which concentrates the rays of light reflected therefrom.

Figure 1:
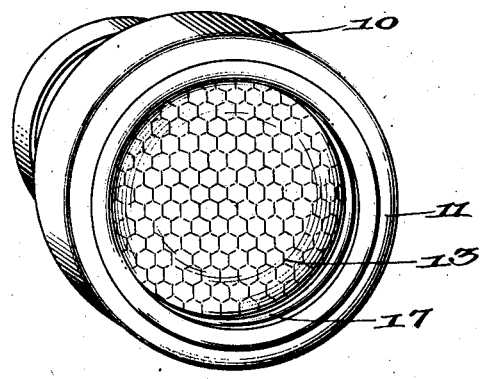
Figure 2:
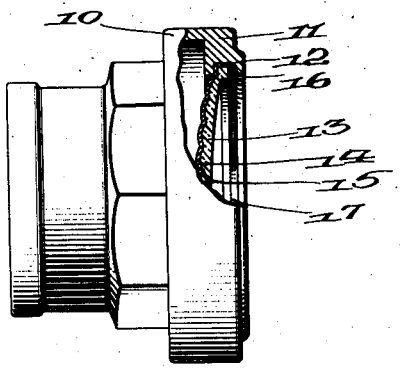

Other and further objects will be apparent from the following description and drawings, in which Figure 1 is a perspective view of the hub cap comprising this invention;

Figure 2 is a side view of the hub cap partly broken away to show the reflector mounting.

Referring more particularly to the drawings:

The hub cap body 10 is formed with a laterally projecting flange 11 which has an annular, peripheral groove 12 for the reception of a reflector 13.

The reflector is a concave disk preferably of glass or other transparent or translucent substance, and is intended to be colored to more readily arrest attention. Its outer concave surface is substantially smooth, while its reverse, or convex surface, is formed with a plurality of small, spaced projections 14 which are covered with a coating of quicksilver or other reflecting substance 15, so that they readily and individually reflect light thrown upon them.

The particular construction of the reflector, except for its concave shape and smooth outer surface does not form an essential part of this invention and is described merely by way of illustration.

A peripheral flange 16 on the reflector engages in the groove 12 of the hub cap flange and is held in position by a snap ring 17. Thus, in the event of breakage the reflector may be replaced readily by removing the ring, and inserting a new one in its place in the groove 12, thereafter applying the snap ring to hold it securely in place.

In ordinary use, however, the reflector is protected against breakage by the lateral flange 11 of the hub cap which projects beyond its front surface.

What I claim is:

1. A hub cap comprising a body portion having a laterally projecting flange and a concave reflector inset with respect to said flange to be protected thereby and retained in said body portion.

2. A hub cap comprising a body portion having a laterally projecting flange defining a reflector receiving opening, a concave reflector inset with respect to the flange, said reflector having a smooth outer surface and an inner surface composed of a plurality of reflecting facets, and fastening means associated with said flange for holding the reflector in position in the hub cap.

In testimony whereof I affix my signature.

JOHN H. MUNSON.